E. B. Beach,
Tool Chuck,

N°. 44,067.      Patented Sep. 6, 1864.

Witnesses
Wm. F. McNamard
J. P. Hall

Inventor
E B Beach
per Munn & Co
Attorneys

UNITED STATES PATENT OFFICE.

EDGAR B. BEACH, OF WEST MERIDEN, CONNECTICUT.

IMPROVED SELF-CENTERING CHUCK.

Specification forming part of Letters Patent No. 44,067, dated September 6, 1864.

*To all whom it may concern:*

Be it known that I, EDGAR B. BEACH, of West Meriden, in the county of New Haven and State of Connecticut, have invented a new and Improved Self-Centering Chuck; and I do hereby declare that the following is a full, clear, and exact description thereof, which will enable those skilled in the art to make and use the same, reference being had to the accompanying drawings, forming part of this specification, in which—

Figure 1:
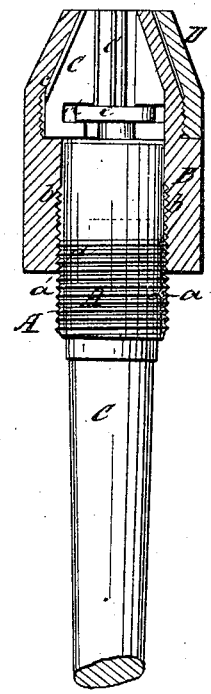
Figure 2:
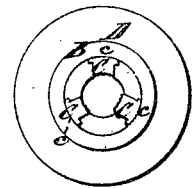

Figure 1 represents a longitudinal central section of my invention. Fig. 2 is an end view of the same.

Similar letters of reference indicate corresponding parts.

This invention consists in the use of three (more or less) inclined or converging guide-ways in combination with the jaws of the chuck, to which a longitudinally-sliding motion is imparted by a central screw or other suitable means in such a manner that said jaws, on being forced out in the converging guideways, will contract concentrically and clamp an article placed between them and hold it firmly and in the true center of the lathe-spindle to which said chuck is attached.

A represents a screw-spindle, which forms the guide for the head B of my chuck. This screw-spindle is bored out at one end and fitted on a conical plug, C, which is inserted into the lathe-spindle in the ordinary manner; or said screw-spindle may be secured to the lathe-spindle in any other suitable manner. Great care must be taken, however, to secure said screw-spindle so that it runs perfectly true, and that it can readily be taken off and reattached without running out of truth. The head B is provided at its inner end with an internal screw-thread, $b$, which screws over the corresponding male thread, $a$, of the spindle A, and the outer end of said head is tapering and provided with three (more or less) converging guideways, $c$, in which the jaws C move in and out. These jaws are placed into the guideways from the outside, and they are prevented from dropping off by a cap, D, which screws on the head B. This cap is tapering to correspond to the converging outer edges of the jaws, so that if a small article is placed in the chuck it can be reached with the tool close up to the jaws C with more convenience than it could if the cap should be made cylindrical throughout. The inner edges of the jaws are parallel with and equidistant from the central axis of the chuck, and they are provided with notches $d$, which catch over a collar, $e$, secured to and projecting from the extreme end of the screw-spindle A.

If a drill, tap, or other smaller article is to be inserted into this chuck, the jaws are opened by turning the head B out, and after the article has been entered between the jaws the head B is turned in on the screw-spindle, whereby the jaws close up and clamp the article tight. The inner edges of the jaws move in and out perfectly concentric, so that an article placed between them will always be in the center, and no centering is required.

This chuck is applicable in turning small articles or in drilling or cutting screws, and it is of very great convenience, since by its aid a drill or tap or other tool can be readily centered in the lathe without loss of time, and articles to be turned can be conveniently reached with the tool, the outside of my chuck being perfectly smooth and its point tapering so that the danger of being caught in a screw or other projection is obviated, and the articles to be turned can be worked off quick and with little loss of time.

I claim as new and desire to secure by Letters Patent—

The inclined converging guideways $c$, in combination with the jaws C, head B, and screw-spindle A, constructed and operating in the manner and for the purpose substantially as herein shown and described.

EDGAR B. BEACH.

Witnesses:
JOHN S. CLARK,
CHARLES N. HANAY.